(12) United States Patent
Beals et al.

(10) Patent No.: US 11,734,008 B1
(45) Date of Patent: Aug. 22, 2023

(54) REUSABLE SETS OF INSTRUCTIONS FOR RESPONDING TO INCIDENTS IN INFORMATION TECHNOLOGY ENVIRONMENTS

(71) Applicant: Splunk Inc., San Francisco, CA (US)

(72) Inventors: Trenton John Beals, Hayward, CA (US); Glenn Gallien, San Francisco, CA (US); Govind Salinas, Sunnyvale, CA (US); Sourabh Satish, Freemont, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/506,440

(22) Filed: Oct. 20, 2021

Related U.S. Application Data

(63) Continuation of application No. 16/119,238, filed on Aug. 31, 2018, now Pat. No. 11,182,163.

(51) Int. Cl.
*G06F 9/30* (2018.01)

(52) U.S. Cl.
CPC .................. *G06F 9/3017* (2013.01)

(58) Field of Classification Search
None
See application file for complete search history.

(56) References Cited

U.S. PATENT DOCUMENTS

| | | | |
|---|---|---|---|
| 9,253,202 B2 | 2/2016 | Thakur | |
| 9,336,385 B1* | 5/2016 | Spencer | ................ G06F 21/564 |
| 10,050,999 B1 | 8/2018 | Rossman | |
| 2012/0224057 A1* | 9/2012 | Gill | ...................... G06Q 10/063 348/143 |
| 2012/0240186 A1* | 9/2012 | Yoo | ..................... H04L 63/0263 726/1 |
| 2016/0099963 A1 | 4/2016 | Mahaffey et al. | |

(Continued)

OTHER PUBLICATIONS

Final Office Action, U.S. Appl. No. 16/119,238, dated Aug. 31, 2020, 22 pages.

(Continued)

*Primary Examiner* — James A Edwards
(74) *Attorney, Agent, or Firm* — Nicholson De Vos Webster & Elliott, LLP

(57) ABSTRACT

Examples described herein relate to customization of courses of action for responding to incidents in information technology (IT) environments. An incident management service executes incident response monitoring, identification and remediation across an IT environment for one or more entities that may have their own configuration of computing assets (computing environment) within the IT environment. A course of action outlines remediation actions for responding to specific types of incidents within an IT environment. A course of action is customized for implementation within a particular computing environment associated with an entity. Customization of a course of action comprises generation and implementation of sets of instructions that are usable to tailor remedial actions for execution in computing environments of different entities. A set of instructions provides commands/calls that are specific to computing assets associated with an entity, which are usable to execute remedial actions for a specific type of incident.

20 Claims, 5 Drawing Sheets

(56) References Cited

U.S. PATENT DOCUMENTS

2016/0219048 A1* 7/2016 Porras .................... H04L 63/20
2016/0248798 A1   8/2016 Cabrera et al.
2017/0286684 A1  10/2017 Lovelace et al.
2017/0366582 A1* 12/2017 Kothekar .............. H04L 63/101
2019/0205542 A1   7/2019 Kao et al.
2019/0340004 A1* 11/2019 Garay ................... G06Q 10/06

OTHER PUBLICATIONS

Non-Final Office Action, U.S. Appl. No. 16/119,238, dated Mar. 18, 2021, 20 pages.
Non-Final Office Action, U.S. Appl. No. 16/119,238, dated Mar. 13, 2020, 17 pages.
Notice of Allowance, U.S. Appl. No. 16/119,238, dated Jul. 14, 2021, 8 pages.

* cited by examiner

REUSABLE SETS OF INSTRUCTIONS FOR RESPONDING TO INCIDENTS IN INFORMATION TECHNOLOGY ENVIRONMENTS

CROSS-REFERENCE TO RELATED APPLICATIONS

This application claims benefit under 35 U.S.C. § 120 as a continuation of U.S. application Ser. No. 16/119,238, filed Aug. 31, 2018, the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL BACKGROUND

Information technology (IT) environments often employ various computing components, both physical and virtual, to provide desired operations. These computing elements may include end user computing devices, host computing devices, virtual machines, switches, routers, firewalls, and the like. To maintain efficient and effective operations of the IT environment, incident response services may be employed that can respond to various incidents within the IT environment. These incidents may include or be associated with viruses, malware, spyware, denial of service attacks, phishing attacks, server crashes, device failures, power outages, unknown communications, or some other similar incident.

However, while incident response services provide response operations to incidents within the IT environment, difficulties arise as the size and complexity of the IT environment increases. These difficulties are often compounded when the new computing components provide different operations and are configured with varying hardware and software configurations. Further, the increasing number computing components in combination with limited administrative personnel and resources can make it difficult to manage the investigation and remediation of incidents in the environment. Even with ample administrators or analyst users, it can be cumbersome to coordinate the investigation and remediation efforts.

SUMMARY

The technology described herein improves collaboration systems, user interfaces, and other aspects of incident management services and systems for investigating and remediating threats or other incidents in IT environments. Examples described herein relate to customization of courses of action for responding to incidents in information technology (IT) environments. An incident management service executes incident response monitoring, identification and remediation across an IT environment for one or more entities that may have their own configuration of computing assets (computing environment) within the IT environment. A course of action outlines remediation actions for responding to specific types of incidents within an IT environment. A course of action is customized for implementation within a particular computing environment associated with an entity. Customization of a course of action comprises generation and implementation of instruction sets that are usable to tailor remedial actions for execution in computing environments of different entities. An instruction set provides commands/calls that are specific to computing assets associated with an entity, which are usable to execute remedial actions for a specific type of incident. This enables the incident management service to improve incident remediation processing and efficiency when servicing different entities.

DETAILED DESCRIPTION

Figure 1:
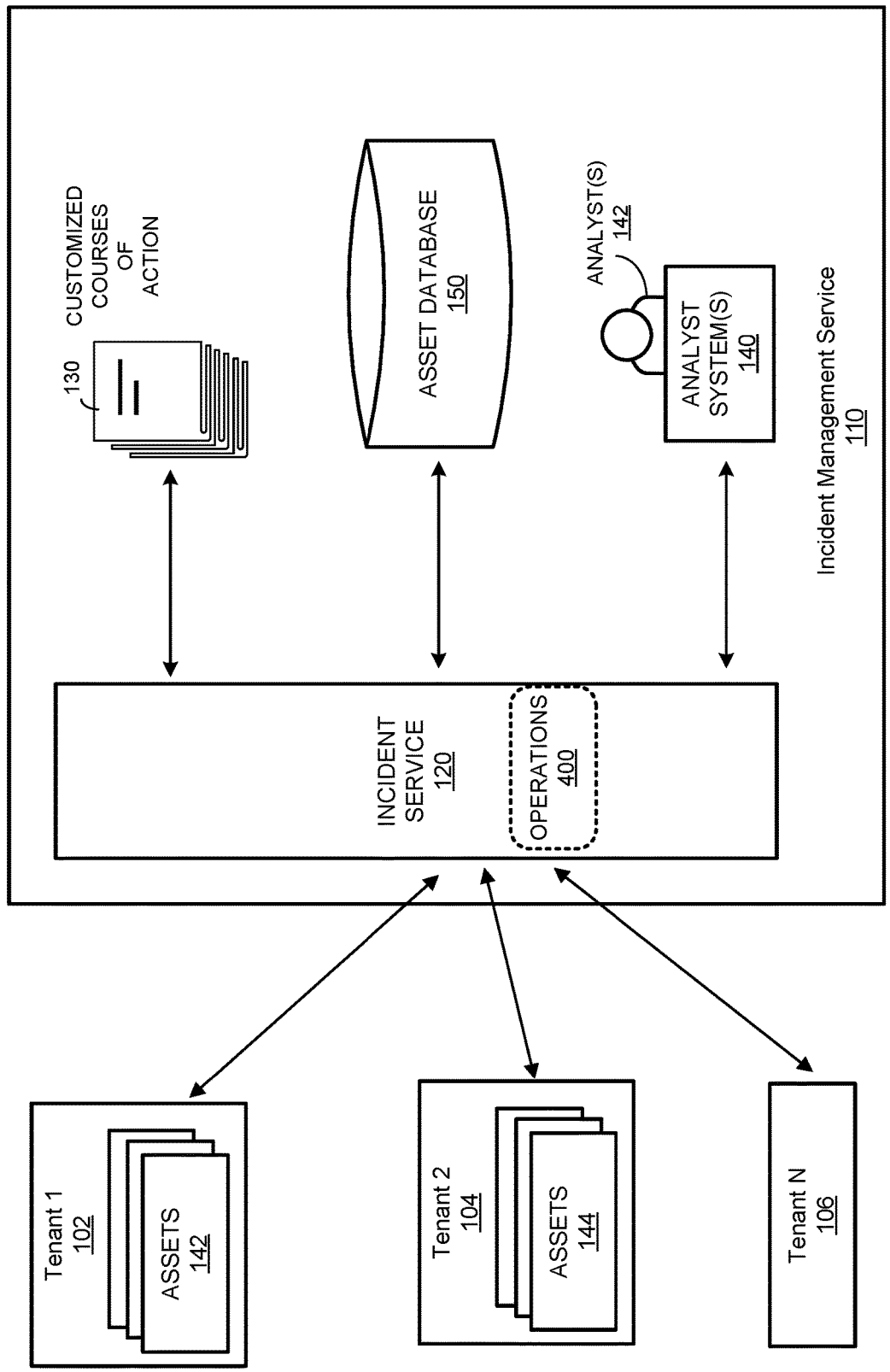
FIG. 1 illustrates an example of an information technology (IT) environment for incident response management according to an implementation.

Examples described herein relate to customization of courses of action for responding to incidents in information technology (IT) environments. An incident management service executes incident response monitoring, identification and remediation across an IT environment for one or more entities that may have their own configuration of computing assets (computing environment) within the IT environment. A course of action outlines remediation actions for responding to specific types of incidents within an IT environment. A course of action is customized for implementation within a particular computing environment associated with an entity. Customization of a course of action comprises generation and implementation of instruction sets that are usable to tailor remedial actions for execution in computing environments of different entities. An instruction set provides commands/calls that are specific to computing assets associated with an entity, which are usable to execute remedial actions for a specific type of incident. This enables the incident management service to improve incident remediation processing and efficiency when servicing different entities.

An IT environment, as defined herein, refers to a collective assembly of computing assets interfacing with each other over a network connection. Any number of entities may be associated with an IT environment, where specific entities may have their own configuration of computing assets for execution of entity-specific services and processes. A computing environment, as described herein, refers to a configuration of computing assets for operation of entity-specific services and processes. A computing environment may be specific to a particular entity or multiple different entities may operate within a specific computing environment. An entity may comprise an organization, a subset of an organization, or some other similar group that implements the incident management service to supplement operation of its own computing elements, services, and processes.

An incident management service may be implemented across the IT environment providing incident monitoring and remediation for different entities. A multi-tenant IT environment, as described herein, is intended to describe the integration of an incident management service across the IT environment for servicing of multiple different entities. Multi-tenancy described herein extends to examples where different entities exist in a single computing environment or across multiple entity-specific computing environments (within the IT environment) that each correspond to a specific entity. In one example of a multi-tenant IT environment, an entity may be associated with any number of tenant accounts that are monitored by the incident management service. In another example of a multi-tenant IT environment, the incident management service is configured to monitor tenant accounts associated with a first entity-specific computing environment as well as tenant accounts associated with any number of other entity-specific computing environments. For instance, different entities may be considered as tenant accounts within a multi-tenant IT environment. The incident management service is configured to create a customized course of action for incident remediation that is tailored for a specific entity. In some examples, the incident management service may leverage incident data, from incidents across multiple entities, to enhance processing operations for customization of a course of action.

In an IT environment that comprises multiple different entities, respective entities often have different configurations of computing assets. This can present challenges for analysts of an incident management system/service, especially when managing large amounts of data across a plurality of different entities. Furthermore, varying configurations of computing assets across different entities may pose implementation issues for analysts during incident remediation. For instance, different computing assets of an entity may be coded in different programming languages, which may require special attention from analysts to remediate issues across different entities. In another instance, an entity may (knowingly or unknowingly) contract out implementation of specific computing assets, which may present challenges for analysts to obtain information necessary for incident remediation, among other issues.

In view of the foregoing technical challenges, the present disclosure provides a plurality of technical advantages that comprise: improving processing efficiency in components and services associated with an incident management service; reducing latency during incident remediation processing; improving management of big data associated with incident response management; automating generation of example instruction sets for incident remediation; automating implementation of courses of action through execution of customizable instruction sets; improving analyst interaction with an incident management service including provision of an improved graphical user interface (GUI) for incident response processing; improving interaction between tenants and analysts of an incident management service; and improving scalability of an incident management service where an IT environment comprises multiple different entity-specific computing environments, among other technical advantages.

FIG. 1 illustrates an example of an IT environment 100 for incident response management according to an implementation. An IT environment 100 comprises IT infrastructure configured to serve one or more entities, wherein IT infrastructure comprises hardware, software, network resources/services, security resources/services and any combination thereof. IT environment 100 refers to the integration of an incident management service 110 with one or more entity-specific computing environments. An IT environment 100 may be a single computing environment or comprise multiple subsidiary computing environments that may be entity-specific, as described in the foregoing description. In the example shown for IT environment 100, incident management service 110 is implemented to interface with a plurality of tenants (e.g., tenants 1-N; 102-106) providing incident identification and remediation measures across one or more entities. Tenants (e.g., 1-N; 102-106) may be collectively associated with a single entity or tenants may each be associated with different entities. The incident management service 110 provides a platform of applications, services and components (e.g., computing assets) or any combination thereof implementing service-based security measures, monitoring and incident management across tenants 1-N; 102-106.

Example tenants (1-N; 102-106) respectively comprise computing assets 142-144. Computing assets (or assets) may comprise any combination of components (hardware, software or combination thereof), applications and/or services. Computing assets include but are not limited to: physical computing systems (e.g. personal computing systems, host computing systems, hardware components and the like), virtual computing systems (e.g. virtual machines or containers, software components), networking interfaces/connections, applications, services, data structures (including electronic files) or some other similar computing components. Non-limiting examples of service-based computing assets may comprise but are not limited to: internet protocol (IP) geolocational identification services, file reputation evaluation services, an intrusion management services (e.g., intrusion and vulnerability detection and remediation), authentication services, firewall services, file/data storage services, database services and a data log services, among other examples. Furthermore, non-limiting examples of component-based computing assets may comprise but are not limited to: firewalls, routers, modems, physical computing systems, virtual computing systems and data storages, among other examples.

In one instance, each respective tenant may be associated with its own computing environment (within IT environment 100). In another instance, multiple tenants may be associated with a specific computing environment. A computing environment may comprise a configured arrangement of computing assets for operations of systems and/or services associated with an entity in which the tenant is affiliated. Examples of computing assets have been provided in the foregoing description. Moreover, computing assets may comprise services and components (e.g., hardware, software or combination thereof), implemented by incident management service 110. Such computing assets may interface with computing assets 142-144 of tenants to enable the incident management service 110 to be integrated within a computing environment of an entity. For example, a tenant 102 may comprise computing assets 142 that may include, devices, data, services and components (hardware and/or software, virtual machines), which the incident management service 110 may interface with to provide network security, monitoring and incident management for computing environments within IT environment 100.

An incident management service 110 is platform service that connects a plurality of applications/services and computing assets for execution of processing for incident management. The incident management service 110 may implement any number of components, in a system configuration, comprising but not limited to: incident service 120; courses of action 130; analyst system(s) 140; an asset database 150 and any other type of computing asset(s). For instance, the incident management service 110 comprises one or more computing assets, operating in one or more computing environments, configured for investigating and remediating threats or other incidents in IT environment 100. Incident management service 110 identifies incidents (e.g., threats, vulnerabilities, lack of resources allocated) and implements remediation measures across the plurality of different entities. During operation, computing assets 142-144 may encounter incidents, such as data threats, potential security vulnerabilities, operational malfunction or crashes that can subject a computing environment of a tenant to the loss of data, interruption in services, or some other incident. Incidents may comprise but are not limited to: viruses, malware, spyware, denial of service attacks, phishing attacks, server crashes, device failures, virtual machine issues, power outages, or some other similar examples. Components and/or computing assets of the incident management service 110 may be connected over a network connection. The incident management service 110 may further interface with tenants 1-N; 102-106 via a network connection as described herein.

Among other components, the incident management service 110 implements an example incident service 120 configured to execute processing operations for identification of incidents and execution of remediation processing to remediate issues in a computing environment of an entity. An example incident service 120 is one or more computing assets (e.g., service components) configured for incident response management including the identification and remediation of incidents across the multi-tenant IT environment 100. The incident service 120 may be configured to execute processing supporting incident response management, which may comprise operations for: data aggregation; data correlation; alerting/notification provision (e.g., to analysts, tenants, end-users); compliance data gathering and reporting; implementation of policies and procedures (including data retention); forensic analysis (e.g., evaluation of data logs, computing assets); implementation of a GUI including a dashboard tool providing analysts with real-time data (and historical data) for incident management; management of customizable courses of action 130; and generation and implementation of customizable instruction sets for implementing customizable courses of action 130, among other examples.

In operation, the incident service 120 is configured to operate in real-time (or near real-time) providing front-end resources (e.g., GUI) for users (e.g., analyst(s) 142 and/or users associated with a tenant 1-N; 102-106), and further interface with other components (e.g., back-end resources) of the incident management service 110 to enable incident identification and remediation. For example, an analyst system 140 may utilize the incident service 120 to access incident information associated with an identified incident as well as retrieve and implement customized courses of action 130 to remediate any issues associated with an identified incident. Incident remediation may comprise processing operations including but not limited to: identifying courses of action for specific types of incident, identifying computing assets associated with entity-specific computing environments; generating of a customized course of action 130 for incident remediation of a specific type of incident within an identified computing environment; and execution of the instruction set for implementation of the customized course of action 130 for incident remediation.

Tenants 1-N; 102-106 may be configured to connect with an incident service 120, of an incident management service 110, over any type of network connection, as known to one skilled in the field of art, including cloud-based network connection and distributed network connection. Communication between computing assets across the IT environment 100 occurs through processing operations and/or components as known to one skilled in the field of art. In execution, interfacing between computing assets occurs through one or more application programming interfaces (APIs) or the like. Computing assets may be programmed to receive and process data in an instruction format (or instruction formats). An instruction format is executable code that enable program execution (or instructions) for one or more computing assets. Executable code, as described herein, may be any programmed coding comprising but not limited to machine code (e.g., machine language instructions, assembly language instructions), object code, program code, source code or the like. Instruction formats, as recognized by specific computing assets, may vary where one computing asset may not recognize an instruction format of another computing asset and thus require translation. For example, an incident service 120 of the incident management service 110 may include one or more computing assets or other functionality (e.g., programming environment, visual programming environment, compiler) to translate instructions for operation of a customizable course of action to instruction format(s) that are recognizable by computing assets receiving said instructions.

Figure 4:
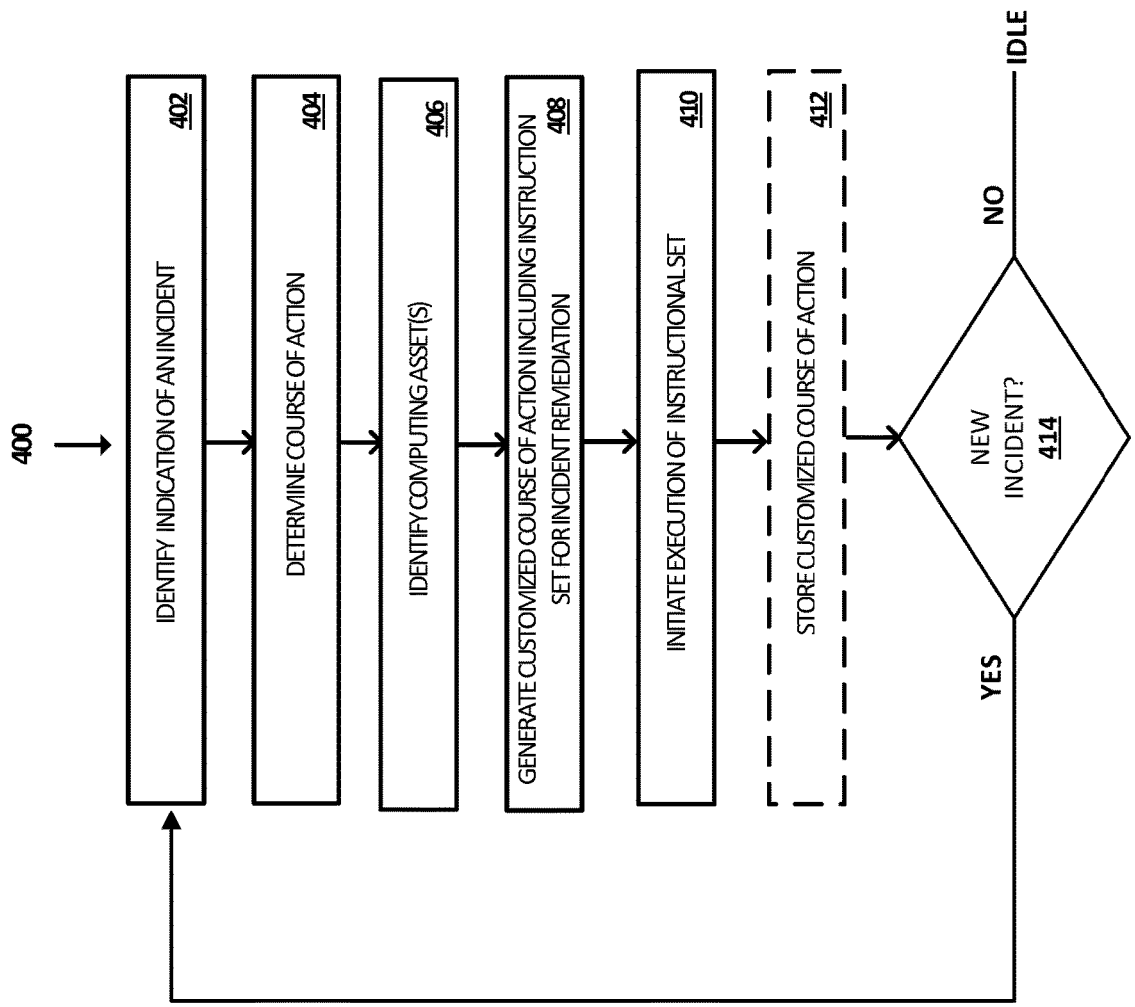
FIG. 4 illustrates an example method for incident response management in an IT environment according to an implementation.

The computing assets, associated with the incident service 120, are programmed to execute operations 400. Operations 400 are programmed code that tailors computing assets for the execution of processing operations related to incident response management (incident detection and remediation) including the processing operations referenced in the foregoing description and processing operations subsequently described in method 400 (FIG. 4). Operations 400 may comprise any of computer programs, software agents, intelligent bots, application programming interfaces (APIs), neural networks and/or machine-learning processing, among other examples.

The incident service 120 may further be connected with an asset database 150. The asset database 150 provides data storage (physical, virtual or a combination thereof) storing an organized collection of data that the incident service 120 is configured to access electronically to further processing operations for incident response management as described herein. Data that may be stored on the asset database 150, and accessed by the incident service 120, comprises but is not limited to: operations 400; policy data; network configuration data for the IT environment 100 including individual tenant computing environments; communication protocols including protocols for interfacing with entities and/or tenants, data for analyst systems 140, data for computing assets (including instruction formatting data), customized courses of action 130 (e.g., specific courses of action for different entities); compiler data and programming language(s) for generation of instruction set(s) and corresponding data instructions for the implementation of customized courses of action; log data for operation of the incident management service 110; log data related to specific entities (e.g., tenants 1-N; 102-106) including user account data that may be required for incident remediation; user interface data for system execution by analysts 142; incident management form data for incident tracking and population of incident information described herein; and telemetry data associated with execution of the incident service 120, among other examples.

In some implementations, incident service 120, when identifying an incident such as a data threat/vulnerability, may employ security information and event management (STEM) services that are used to automate the identification of incidents within the IT environment 100. For example, if an unknown process were operating on asset 142, the STEM service may identify the incident and be used to provide information about the incident to incident management service 110. This information may include information about the name of the unknown process, the source of the process, any credential or licensing information for the software, or some other similar information about the process. In some examples, in addition to or in place of the automated identification of incidents within a computing environment, incident service 120 may employ a "ticket" system, wherein users and analysts of the environment may report incidents. As an example, when an email is received from an unknown party looking for personal information from an employee of the organization, the employee may report the email as an incident. Once reported to incident management service 110, information about the email may be used to identify the type of incident presented, as well as information about the source of the email. This information may be identified from the user reporting the incident or may be identified via an automated operation following the report of the incident, wherein the information may be obtained based on a computing asset provided by the reporting user, a known process identified by the reporting user, an unknown IP address identified by the user, or some other similar information provided from the user.

In some implementations, incident management service 110, incident service 120 and analyst systems 140 may represent at least a portion of a security orchestration, automation, and response (SOAR) platform, wherein the SOAR platform manages operations by automating tasks, orchestrating workflows, improving collaboration, and enabling entities to respond to incidents within their computing environment.

After an incident is identified, the incident service 120 is configured to analyze information associated with the incident to determine how to respond to the incident. In particular, incident service 120 may retrieve or generate information about the incident for one or more analysts of analysts (e.g., analyst 142) and implement response actions to address or remediate the particular incident. The information provided by the incident service 120 may include attributes of the incident (IP addresses, process names, affected users, and the like), and may further include suggested security actions to be taken to address or remediate the incident, wherein the suggestions may be based on the type of incident, the assets involved in the incident, the severity level of the incident, and the like. In the present implementation, incident management service 110 may further include functionality for determining suggestions of other analysts available or capable to assist in responding to a particular incident. In doing so, the incident management service 110 is configured to enable interfacing between analyst systems 140 and the incident service 120. Analyst system(s) 140 connect analysts to other components of the incident management service 110. In one example, the analyst system 140 is one or more computing assets that connect an analyst 142 to a GUI dashboard for incident management. Analyst system(s) 140 may further provide access to a pool of analysts 142 that are available for incident remediation and response management. In response to a detection of an incident, an analyst 142, via an analyst system 140, may identify the report of an incident, investigate the threat, and initiate one or more response actions to mitigate, monitor, remove, or provide any other similar operation to remediate the incident.

Initiation of response remediation comprises generation and implementation of a customized course of action 130. A course of action outlines remediation actions for responding to specific types of incidents within an IT environment. A course of action is customized for implementation within a particular computing environment associated with an entity. A customized course of action 130 comprises generation and implementation of instruction sets that are usable to tailor remedial actions for execution in computing environments of different entities. An instruction set provides commands/calls that are specific to computing assets associated with an entity, which are usable to execute remedial actions for a specific type of incident. This enables the incident management service to improve incident remediation processing and efficiency when servicing different entities.

In one example, an electronic playbook may be stored on asset database 150 to assist analysts 142 with incident remediation of identified incidents. An analyst 142, may access the electronic playbook via an analyst system 140 that is executing incident service 120. The electronic playbook is a collection of data to assist with incident remediation including courses of action for responding to specific types of incidents. The electronic playbook may further comprise alerts, user identification and contact data and associated data for incident identification and remediation. Among other examples, a customized course of action 130 may be tailored specifically for an entity-specific computing environment. The customized course of action 130 may be: specific to particular incidents, specific to a classification/type of incident, specific to a particular group of user accounts (e.g., tenants), or designed to be implemented across multiple different entities an IT environment 100 (e.g., multi-tenant IT environment). An electronic playbook may further comprise customized courses of action 130 including instruction sets for execution of remediation actions for specific types of incidents in entity-specific computing environments. An electronic playbook may be continuously updated (in real-time or near real-time) with new insights to assist an analyst 142 with remediation of an identified incident including results of application of instruction sets to resolve specific issues. This may further assist an analyst 142 in selecting a best possible response to remediate an identified issue as well as enable learning models to be built to automatically implement an instruction set for incident remediation.

A customized course of action 130 may comprise an operational flow of one or more actions for incident remediation. In one example, a customized course of action 130 may be generated and implemented by the incident management service 110, where the accompanying operational flow may be generally applicable to a plurality of different entities. During remediation of an incident, having customized course of action 130 that is tailored for an entity-specific computing environment may greatly improve processing efficiency in remediating an incident as well as improve user interaction and usability of the incident service 120 (e.g., GUI), among other technical benefits. The customized course of action 130 may be programmed in a specific programming language. A non-limiting example of a programming language that may be associated with a customized course of action 130 is a visual programming language. In one implementation, an operation flow may be a flow diagram indicating process flow steps for remediating an incident. However, examples are not so limited. An operational flow may be programmed in any programming language and comprises elements that are graphical, textual, interactive (e.g., including rich data objects) or any combination thereof.

At a time that an incident is being remediated, a course of action may be selected by an analyst, for example, based on evaluation of information compiled for the incident during processing by incident service 120. In one implementation, an incident service 120 may be configured to auto-suggest one or more customized courses of action 130 on behalf of the analyst(s) 142. For instance, the incident management service 110 may be configured to employ a data model (e.g., machine learning model) that correlates aggregated incident information with data associated with courses of action. Such processing may streamline incident remediation by increasing processing efficiency and reducing latency during the time that an incident remains unresolved. An example data model (or multiple data models) may be further configured to generate customized courses of action 130 including instructions sets for executing one or more actions for incident remediation. A data model may be optimized for selection of a customized course of action 130, for example, through supervised or unsupervised training as known to one skilled in the field of art. In yet another instance, the incident management service 110 is configured to automatically select a customized course of action 130 on behalf of an analyst 142, for example, based on correlation scoring or other statistical analysis that may be implemented during data modeling processing.

The incident service 120 customizes courses of action for instruction formats of specific computing assets associated with a computing environment of a tenant (e.g., tenants 1-N; 102-106). That is, an instruction set, for implementation of customized courses of action 130 may be programmatically generated and tailored for a computing environment of an entity. Computing assets of an entity may be analyzed so that one or more instructional sets are programmatically tailored to the required processes of the computing assets in an individual entity. In doing so, the incident service 120 is configured to translate the operational flow of a general course of action to service-specific instructions and/or component-specific instructions. This translation is implemented based on analysis of data associated with the one or more computing assets of an entity-specific computing environment and a process flow associated with a general course of action. Data associated with computing assets may comprise but is not limited to: types of computing assets; configuration data for specific computing assets; and policies associated with a computing environment of a specific entity (e.g., tenant-specific network policies/procedures), among other examples. Non-limiting examples of services and components associated with computing assets have been provided in the foregoing description.

Consider an example where a detected incident relates to a vulnerability in a firewall of tenant. A customizable course of action 130 may suggest investigation of a specific firewall rule that is applicable to most computing environments for the avoidance of certain types of exploits. This may include a number of process flow steps for walking through how to identify whether a firewall rule is set. However, processing operations that identify a firewall (e.g., computing asset) of a tenant-specific computing environment may yield a determination that the specific firewall rule is bypassed in the tenant's computing environment. While this information may resolve an incident issue in some cases, other cases may require additional remediation steps. For example, the tenant may prefer that its firewall rules be modified to activate the specific firewall rule. Evaluation of the tenant's firewall and network settings may enable generation of specific instructions that may be utilized to modify the firewall rules, for example, either through manual guidance of a user by an analyst or by automated implementation of an instruction set through the incident management service 110.

The incident management service 110 may comprise one or more computing assets for generation of an instructions set. Examples of such computing assets comprise but are not limited to: a compiler and a visual code editor. In some examples, a generated instruction set may comprise modification of an operational flow for general courses of action, for example, in the same programming language as that identified in a specific customized course of action 130 or a different type of programming language. In one instance, a flow diagram, associated with a customized course of action 130, is updated to reflect a state of the computing assets associated with a computing environment of a tenant, which may be provided to an analyst (e.g., analyst 142). In another instance, an instruction set comprises an ordered listing of instructions that an analyst may follow to help guide a user through remediation processing. In an alternative implementation, generation of an instruction set comprises programmatically generating executable code that is applicable to automate remediation of an issue associated with the incident. For example, the instruction set may be presented to an analyst through a GUI of the incident service 120, whereby the analyst may control initiation of the executable code.

Generated instruction sets may be stored, for example, on the asset database 150 for subsequent reference and/or usage. In some instances, the incident service 120 is configured to check if there is an already existing instruction set for remediating issues associated with an incident before generating a new instruction set. In one example, an instruction set may be utilized to resolve a subsequent incident in a computing environment of an entity when the subsequent incident pertains to the same (or a similar) issue. In an alternative implementation, the generated instruction set may be cross-referenced for generation of instruction sets for other entities in the IT environment 100. In one alternative instance, a determination may be made as to whether a previously generated instruction set is usable for another entity, for example, before a new instruction set is generated for that entity.

Figure 2:
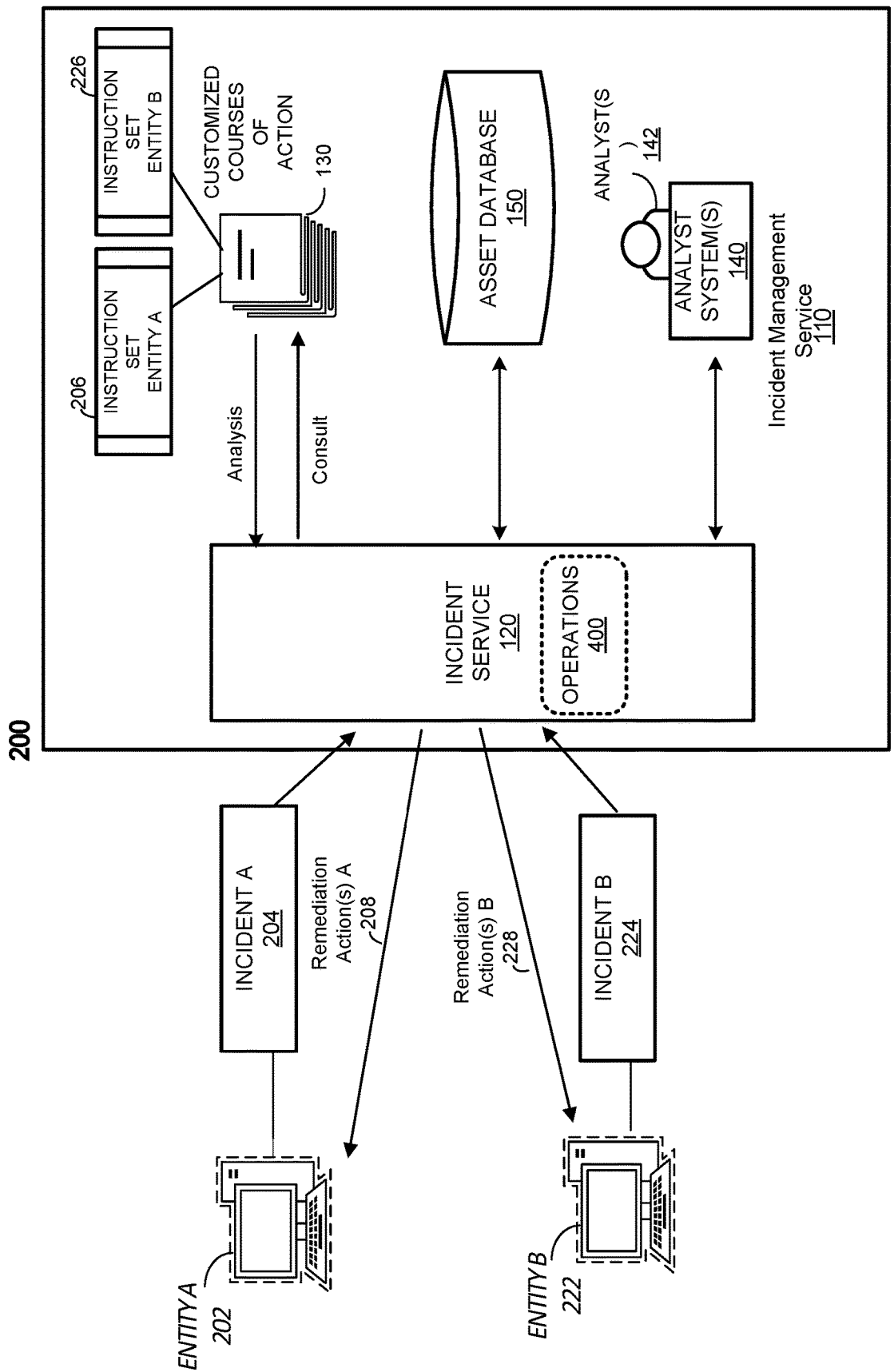
FIG. 2 illustrates example operation of an incident management service in a multi-tenant IT environment according to an implementation.

FIG. 2 illustrates operation of an incident management service 110 in a multi-tenant IT environment 200 according to an implementation. Examples of a multi-tenant IT environment have been provided in the foregoing description. An incident management service 110 has been described in the foregoing description including the description of FIG. 1. FIG. 2 illustrates non-limiting examples related to processing incident processing for different entities within a multi-tenant IT environment 200. The multi-tenant IT environment 200, shown in FIG. 2, comprises entity A 202; and entity B 222, which are connected with an incident management service 110. FIG. 2 illustrates process flows for handling specific incidents identified within entity-specific computing environments (e.g., computing environment of entity A 202). Entities A and B (202 and 222) may interface with an incident management service 110 via network connection as described in the foregoing description.

Entities A and B (202 and 222) may each be associated with one or more tenant accounts. A tenant is one or more grouping of users having specific access and privilege settings within an entity-specific computing environment. As referenced in the foregoing description, entities may be connected with an incident management service 110 in a multi-tenant IT environment 200. Computing assets of multi-tenant IT environment 200 are connected over network connection including hardware components and software components or combination thereof. In one example, computing assets of multi-tenant IT environment 200 may interface through a distributed networking environment (e.g., cloud-based computing environment).

In the example shown in FIG. 2, a first incident 204 (incident A) is identified within a computing environment associated with entity A 202. Incident A 204 may be identified by any of: a user associated with entity A 202; a computing device associated with entity A 202; incident service 120; or a combination thereof. Detection of an incident may occur through any number of modalities comprising but not limited to: call communication (e.g., telephone call, VoIP) between a user and an analyst 142; chat/messaging communication between the user an analyst 142; instant messaging communication; email communication; and execution of an incident service 120 including active monitoring and/or scanning for intrusions/vulnerabilities, among other examples. Processing by an incident service 120, among other computing assets associated with incident management service 110, have been described in the foregoing description. A reporting of incident A 204 may be initiated by a user associated with tenant A 202 or an analyst 142 associated with analyst system 140 of the incident management service 110.

An incident service 120 may be executed to assist analyst system(s) 140 with incident response management. For example, STEM servicing may be implemented to identify an incident, collect incident information and provide information about the incident to computing assets of the incident management service 110. After an incident (e.g., incident A 204) is identified, the incident service 120 is configured to analyze information associated with the incident to determine how to respond to the incident. In particular, the incident service 120 may retrieve or generate information about the incident for an analyst 142 and implement response actions to address or remediate the particular incident (e.g., incident A 204). Computing assets associated with entity A 202 may be identified and evaluated, where such processing is utilized to translate a workflow associated with a customized course of action 130 for incident A 204 into an instruction set 206 for incident remediation. Generation and implementation of an instruction set (such as an instruction set 206 for entity A 202) has been described in the foregoing description. Instruction set 206 comprises instructions that are programmatically tailored for a computing environment associated with entity A 202, whereby issues associated with an identified incident A 204 may be remediated.

To assist with operations described herein, the incident service 120 may comprise a GUI that is accessed by analyst(s) 142 via analyst system 140 (e.g., through computing assets associated with analyst system 140). Information associated with incident A 204, including response actions, may be surfaced through the GUI of the incident service 120. The GUI may further comprise user interface features related to manage of a dashboard tool providing analyst(s) 142 with real-time data (and historical data) for incident management. User interface features for a dashboard tool may be further adapted to control presentation of incident information, access general courses of action, customized courses of action 130, access to instruction sets 206 and 226 for incident remediation, telemetry data and communication with tenants, among other types of functionality.

An analyst system 140 interfaces with a computing environment of entity A 202, via incident service 120, to provide remediation action(s) 208 ("remediation actions(s) A") for remediation of incident A 204. In one example, provision of remediation action(s) A 208 may occur through action by an analyst 142 taken via a GUI of the incident service 120. Remediation action(s) A 208 may comprise relay of the instruction set 206 to entity A 202. In one example, the instruction set 206 may be transmitted to entity A 202, where an account (e.g., user account or administrative account) associated with entity A 202 may manually initiate implementation of the instruction set 206 to address the incident A 204. In another implementation, provision of remediation action(s) A 208 may comprise an instance where an analyst 142 explicitly communicates instructions, associated with instruction set 206, to a user account associated with entity A 202. For example, the analyst 142 may be on a call communication or messaging service with an administrator of entity A 202, where specific instructions from the instruction set 206 are relayed for remediation of the incident A 204. In yet another implementation, provision of remediation action(s) A 208 may comprise an instance where an analyst 142 initiates remote access to one or more computing assets associated with entity A 202. In that case, the analyst 142 may directly apply instructions from the instruction set 206 to execute remediation action(s) A 208 within the computing environment of entity A 202. In one such remote access example, execution of the instruction set 206 is automatically initiated by the analyst 142 on behalf of entity A 202.

Moreover, in the example shown in FIG. 2, a second incident 224 (incident B) is identified within a computing environment associated with entity B 222. Incident B 224 may be identified by any of: a user associated with entity B 222; a computing device associated with tenant B 222; incident service 120; or a combination thereof. Processing for incident detection, identification of incident information and incident remediation processing related to the second incident 224 is similar to the foregoing description describing the processing of the first incident 204 (incident A) for entity A 202. Computing assets associated with entity B 222 may be identified and evaluated, where such processing is utilized to translate a workflow associated with a customize course of action 130 into an instruction set 226 for entity B 222. Instruction set 226 comprises instructions that are programmatically tailored for a computing environment associated with entity B 222. In the example shown, instruction set 226 for entity B 222 is different from instruction set 206 for entity A 206 whether an incident B 224 has the same issues as that of incident A 204 or different issues because the computing environment for entity B 222 may be different from the computing environment for entity A 202.

An analyst system 140 interfaces with a computing environment of entity B 222, via incident service 120, to provide remediation action(s) 228 ("remediation actions(s) A") for remediation of incident B 224. Provision and/or application of remediation action(s) B 228 within a computing environment of entity B 222 are similar to those described with respect to remediation action(s) A 208 for entity A 202 but may comprise usage of instruction set 226 for tenant B 222. Created instruction sets 206 and 226 for respective entities may be stored, e.g., on asset database 150, and utilized to remediate subsequent similar issues in specific computing environments.

Figure 3:
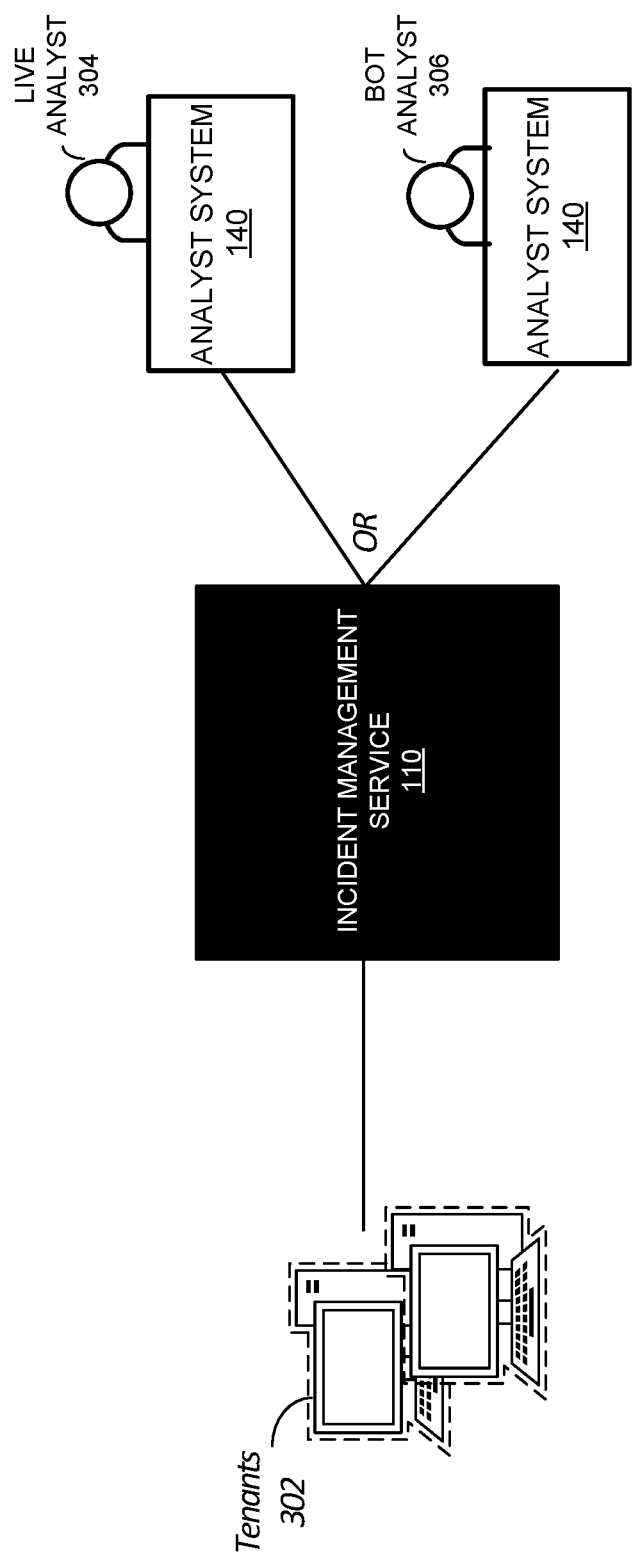
FIG. 3 illustrates an example operational scenario for an interaction between tenants and an incident management service according to an implementation.

FIG. 3 illustrates an example operational scenario 300 for an interaction between tenants and an incident management service 110 according to an implementation. Many of the components in operational scenario 300 have been described in the foregoing description including: tenants); incidents;

an incident management service; and analyst system(s). Operational scenario 300 is provided to illustrate processing operations that extend functionality of an incident management service 110, for example, enabling assignment of a specific analyst system to implement incident remediation in a multi-tenant IT environment. That is, the incident management service 110 may be configured to assign different types of analysts (e.g., live analyst 304 or bot analyst 306) to manage incidents detected in a multi-tenant IT environment based on analysis of incident information.

As described in the foregoing description, an incident may be identified and evaluated by an incident management service 110. In some implementations, the incident management service 110 may further comprise one or more computing assets for selection of a recommended analyst to execute incident response management for an identified incident. In doing so, the incident management service 110 is configured to analyze incident information, as described in the foregoing description, to select a type of analyst system 140 that is most appropriate for incident remediation. For example, the incident management service 110 is configured to execute determination(s) for assigning either a live analyst 304 or a bot analyst 306 to remediate an identified incident. In one example, the incident management service 110 is configured to implement data modeling (e.g., machine learning modeling), among other types of computing assets, to execute determinations for assignment of a specific analyst system. A data model may be trained and adapted based on any type of data including data evaluating previous incident data within a multi-tenant IT environment. In implementation, a live analyst 304 may be an actual person where a bot analyst 306 is a software agent (e.g., intelligent bot; chat bot) that is trained in natural language understanding (NLU) processing. The incident management service 110 may be further trained to execute additional layers of hierarchical analyst curation including selecting a specific live analyst (or bot analyst) from a similar group of analysts. A bot analyst 306 may comprise a natural conversational user interface that enables a bot to be programmed to create dialogue with a user as well as execute tasks/operations on a user behalf. Determinations for selection of a type of analyst may occur based on evaluation of incident information comprising but not limited to: an incident type; a specific tenant (or user account associated with a tenant); tenant preferences; evaluation of pre-populated incident information; a course of action (or proposed course of action); telemetric evaluation of likelihood of success of implementing a live analyst 304 versus implementing a bot analyst 306; and a telemetric evaluation related to ease of execution of an instruction set, among other types of data. In some examples, the incident management service 110 may be further implemented to re-select a recommended analyst, for example, in instances where a recommended analyst is unable to remediate an incident, or the tenant has escalated an incident without resolution.

FIG. 4 illustrates a method 400 for incident response management in an information technology (IT) environment according to an implementation. Processing operations described in method 400 may be executed by components described (FIGS. 1-2), where the foregoing detailed description supports and supplements the recited processing operations in method 400. As an example, method 400 may be executed across a computing system (or computing systems) as described in the description of FIG. 5. Components, described in method 400, may be hardware and/or software components, which are programmed to execute processing operations described herein. Operations performed in method 400 may correspond to operations executed by a system and/or service that execute computer programs, software agents, intelligent bots, application programming interfaces (APIs), neural networks and/or machine-learning processing, among other examples. In some examples, processing operations described in method 400 may be executed by one or more applications/services associated with a web service that has access to a plurality of application/services, devices, knowledge resources, etc. In one instance, processing operations described in method 400 may be implemented by one or more components connected over a distributed network.

Method 400 begins at processing operation 402, where an indication of an incident is identified. Processing operation 402 comprises detecting the occurrence of an incident within an IT environment (e.g., multi-tenant IT environment) as described in the foregoing description. In one example, identification (processing operation 402) of an indication of an incident may occur by an incident management service 110 implementing an incident service 120, as described in the foregoing description including that of FIG. 1. An incident service 120 may be configured to implement real-time (or near real-time) monitoring of computing environments for a plurality of entities within the IT environment. In another example, identification (processing operation 402) of an incident may occur by an entity and propagated to assets associated with an incident service.

In response to an indication of an incident, flow of method 400 may proceed to processing operation 404, where a general course of action may be determined for remediation of the incident. Description of courses of action as well as processing for customization of a course of action (generation of a customized course of action 130) have been provided in the foregoing description including the description of FIG. 1. In one example, a course of action may be configured to indicate an operation flow of one or more actions for incident remediation. For instance, the course of action may be generated in a programming language. A non-limiting example of a programming language is a visual programming language. In another example, a course of action comprises a flow diagram providing steps for incident remediation of an identified incident, as described in the foregoing description.

At processing operation 406, one or more computing assets, associated with a computing environment of the first entity, are identified. Identification (processing operation 406) of a computing asset may comprise identifying one or more computing assets that are related to (e.g., causing or contributing to) issues of the identified incident. Computing assets as well as processing operations for identification of computing assets have been described in the foregoing description. In one example, a computing asset is selected from a group that comprises: services and components (e.g., hardware and/or software components, devices, virtual nodes/machines etc.). Examples of services and components have been provided in the foregoing description. In one example, services are selected from a group that comprises: an internet protocol (IP) geolocational identification service, a file reputation evaluation service, an intrusion management service, an authentication service, a firewall service, a database service and a data log service. In one example, services are selected from a group that comprises: a firewall, a router, a modem, a physical computing system, a virtual computing system and a data storage.

Flow of method 400 may proceed to processing operation 408, where a customized course of action is generated.

Exemplary customized courses of action 130 and generation thereof have been described in the foregoing description. Processing operation 408 comprises generation of an instruction set is generated for incident remediation. Processing operation 408, may comprise execution of processing operations that evaluate a general course of action and the one or more computing assets associated with an entity resulting in generation of an instruction set. Example instruction sets have been described in the foregoing description. An instruction set comprises instructions that correspond to one or more instruction formats associated with identified computing assets. In one instance, an instruction set may comprise executable commands, calls, functions, software packages, etc., which may be executed for incident remediation of a specific type of incident associated with one or more specific computing assets. Computing assets of an entity may be analyzed so that customizable instructional sets are programmatically tailored to the required processes of an individual entity. In doing so, processing operation 408 comprises translating the operational flow of the one or more actions (of a general course of action) into one or more of: service-specific instructions and component-specific instructions.

Translation processing may occur based on data associated with the one or more computing assets and data of the general course of action. Examples of data associated with computing assets that may be utilized for assisting with translation processing has been described in the foregoing description. Translation processing may program new action actions/steps in either the same programming language or a different programming language. In one example, an operational flow of a course of action is translated, from a first programming language to a second programming language, whereby translation processing comprises converting one or more actions of an operational flow to service-specific instructions and/or component-specific instructions. In one instance, one or more executed actions within an operational flow, initially programmed in a first programming language, may have to be programmed in a different programming language to be interface with (or be implemented within) a specific computing environment of an entity. In another implementation of translation processing, an operation flow of a course of actions is translated into executable instructions for incident remediation. This may occur based on evaluation of a classification (e.g., type) of an identified computing asset.

In response to generation of the customized course of action, flow of method 400 may proceed to processing operation 410, where execution of an instruction set associated with a customized course of action 130 is initiated. In one instance, initiation (processing operation 410) comprises automating execution of the instruction set to remediate any issues in a computing environment caused by the detected incident. Implementation details for initiation (processing operation 410) of execution of an instruction set as well as other examples of initiation processing have been provided in the foregoing description. For instance, an analyst may follow an instruction set and direct a user of an entity (e.g., tenant) to update data associated with one or more specific computing assets to remediate an issue.

In some alternative examples of method 400, flow may proceed to processing operation 412, where a customized course of action (including an instruction set for execution thereof) is stored. In some instances, generated instruction sets may be stored for subsequent reference and usage, for example, where reference to a specific instruction set may be added to an electronic playbook for incident remediation. In one example, an instruction set may be utilized to resolve a subsequent incident in a computing environment of an entity when the subsequent incident pertains to the same (or a similar) issue. In an alternative implementation, the generated instruction set may be cross-referenced for generation of instruction sets for other entities in an IT environment. In one alternative instance, a determination may be made as to whether a previously generated instruction set is usable for another entity, for example, before a new instruction set is generated for that entity.

In any example, flow of method 400 may proceed to decision operation 414. At decision operation 414, it is determined whether a new incident is detected. Detection of a new incident may comprise detection of an incident anywhere within the IT environment (e.g., multi-tenant IT environment), where specific type of incident may be relevant to determining whether an existing customized course of action 130 may be utilized for incident remediation or a new customized course of action is required. This may comprise instances where an incident is detected in the computing environment of the same entity as well as instances where an incident is detected in a computing environment of a different entity of the IT environment. In instances where a new incident is not detected, flow of decision operation 414 branches NO and processing of method 400 remains idle until a new incident is detected. In examples where a new incident is detected, flow of decision operation 414 branches YES and processing of method 400 returns to processing operation 402 initiating incident detection.

Figure 5:
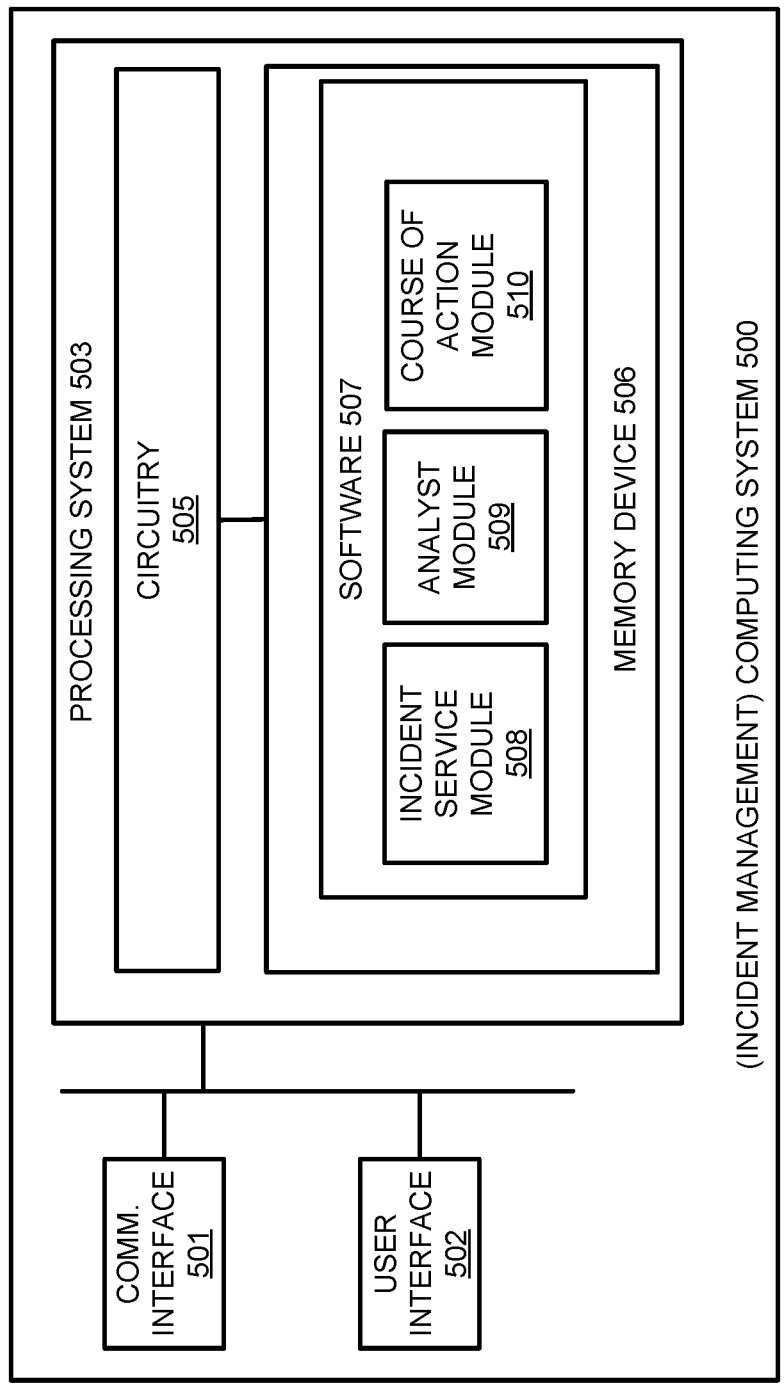
FIG. 5 illustrates an example computing system for incident response management according to an implementation.

FIG. 5 illustrates a computing system 500 for incident response management according to an implementation. Computing system 500 is representative of any computing system or systems with which the various operational architectures, processes, scenarios, and sequences disclosed herein for an incident management service may be implemented. Computing system 500 is an example of a system for implementation of an incident management service, although other examples may exist. An incident management service may be implemented by a collection of computing assets, for example, executing in a system configuration. In some examples, this may comprise one or more server computing systems, desktop computing systems, laptop computing systems, or any other computing system, including combinations thereof. The incident management service integrates with computing assets associated with one or more entities to implement real-time (or near real-time) protection against data threats, vulnerabilities, connection issues, etc., within an IT environment. In doing so, an incident management service is configured to implement processing operations described herein including processing operations for detection of incidents and execution of incident remediation as described in the foregoing description. For example, an incident management service may be any combination of components/computing assets that execute operations 400 (method 400 of FIG. 4), among other processing operations for incident remediation.

Computing system 500 comprises communication interface 501, user interface 502, and processing system 503. Processing system 503 is linked to communication interface 501 and user interface 502. Processing system 503 includes processing circuitry 505 and memory device 506 that stores operating software 507. Computing system 500 may include other well-known components such as a battery and enclosure that are not shown for clarity but are known to one skilled in the field of art.

Communication interface 501 comprises components that communicate over communication links, such as network cards, ports, radio frequency (RF), processing circuitry and software, or some other communication devices. Communication interface 501 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In at least one implementation, communication interface 501 may be used to communicate analyst consoles or systems as well as computing assets within an organization's computing environment.

User interface 502 comprises components that interact with a user to receive user inputs and to present media and/or information. User interface 502 may include a speaker, microphone, buttons, lights, display screen, touch screen, touch pad, scroll wheel, communication port, or some other user input/output apparatus—including combinations thereof. User interface 502 may be omitted in some examples.

Processing circuitry 505 comprises microprocessor and other circuitry that retrieves and executes operating software 507 from memory device 506. Memory device 506 may include volatile and nonvolatile, removable and non-removable media implemented in any method or technology for storage of information, such as computer readable instructions, data structures, program modules, or other data. Memory device 506 may be implemented as a single storage device, but may also be implemented across multiple storage devices or sub-systems. Memory device 506 may comprise additional elements, such as a controller to read operating software 507. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 505 is typically mounted on a circuit board that may also hold memory device 506 and portions of communication interface 501 and user interface 502. Operating software 507 comprises computer programs, firmware, or some other form of machine-readable program instructions. Operating software 507 includes incident service module 508, analyst module 509, and course of action module 510, although any number of software modules may provide a similar operation. Operating software 507 may further include an operating system, utilities, drivers, network interfaces, applications, or some other type of software. When executed by processing circuitry 505, operating software 507 directs processing system 503 to operate computing system 500 as described herein.

In one implementation, incident service module 508 maintains incident response information for analysts in the IT environment, wherein the incident response information provides attributes related to detecting and remediating incidents within the IT environment. While maintaining incident response information, analyst module 509 connects analyst systems to incident response information, where the analysts may identify and remediate incidents, via corresponding analyst systems, through provision of the incident response information. In at least one instance, the analyst module 509 may be configured to execute operations that match a recommended analyst to a detected incident, for example, to optimize remediation as described in the descriptions of FIGS. 1 and 3. The incident service module 508 directs processing system 503 to implement an incident service as described herein, whereby the incident service interfaces with other computing assets for incident identification and remediation. For example, computing system 500 may identify an unknown process executing on a virtual machine of the IT environment. An indication of this incident may be provided, via automated processing of the incident management service or may be entered via a GUI by a tenant or analyst associated with the IT environment.

Once the incident is identified, incident service module 508 may further analyze information associated with the incident, for example, to identify an incident type. This may assist an analyst with identifying applicable courses of action for remediation of the incident. In some implementations, incident type may be identified based on communication characteristics of the incident, IP addresses associated with incident, data being searched by the incident, a process name, or some other similar information about the incident. After the incident is identified, the analyst module 509 may interface with the incident service module 508 to enable identification of a recommended analyst from a plurality of analysts. For example, an analyst may be selected based on specifics of the incident information and the incident type. Recommended analyst(s) may be provided incident response information and courses of action for remediation through the incident service module 508 and/or the course of action module 510.

The course of action module 510 is configured to identify and implement courses of action to resolve an incident identified for an entity, for example, within a computing environment of the entity. That is, like the analyst module 509, the course of action module 510 interfaces with the incident service module 508 to enable incident remediation processing for an identified incident. As referenced in the foregoing, an incident management service (e.g., executing across one or more computing systems 500) may operate in a multi-tenant IT environment. The course of action module 510 is configured to provide courses of action. In doing so, the course of action module 510 interface with the incident service module 508, which may programmatically transform a course of action to an instruction set that is designed for incident remediation in a specific computing environment (e.g., of an entity such as a tenant). Courses of action may be tailored to different entities based on evaluation of any number of factors comprising but not limited to: policies and procedures of a specific entity; computing assets within a computing environment of an entity; successful courses of action previously implemented (including in other tenant computing environments); courses of action generated for other tenants of a multi-tenant IT environment; analyst assessment; and supplemental network information or supplemental security information acquired during evaluation of an incident, among other examples. In some implementations, although a single analyst recommendation may be provided, it should be understood that the analyst recommendations may change dynamically based on the state of the incident. In particular, computing system 500 may be configured to identify supplemental information about the incident and update the suggested analysts based on the supplemental information.

Returning to the elements of FIG. 1, an incident management service, analyst systems, entity/tenant systems, etc., may each comprise communication interfaces, network interfaces, processing systems, computer systems, microprocessors, storage systems, storage media, or some other processing devices or software systems, and can be distributed among multiple devices. Tenant systems (e.g., tenant computing environments) may include computing assets, which may include physical computing systems (host computing systems, user devices, and the like), virtual computing systems, such as virtual machines and containers, routers, switches, and other similar computing systems or network device.

Communication between components of an incident management service may use metal, glass, optical, air, space, or some other material as the transport media. Communication of components described herein may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Such communications may use direct links or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
identifying, by an incident management service, an incident associated with an information technology (IT) environment of a plurality of IT environments monitored by the incident management service;
determining a course of action to be used to respond to the incident in the IT environment, wherein the course of action includes an operational flow of a plurality of actions used to remediate the incident, and wherein the plurality of actions includes an action to be performed by a computing asset of the IT environment;
translating, by the incident management service, the course of action into a set of instructions, wherein translating the set of instructions includes identifying, based on a type of the computing asset in the IT environment, a computing asset type-specific command used to perform the action at the computing asset, wherein the incident management service identifies the computing asset type-specific command from a plurality of computing asset type-specific commands for a plurality of types of computing assets;
executing the set of instructions, wherein executing the set of instructions includes sending, via a network coupling the incident management service to the computing asset, a request to perform the computing asset type-specific command; and
storing the set of instructions for subsequent executions of the course of action against the IT environment.

2. The method of claim 1, wherein the incident is a first incident, and wherein the method further comprises:
identifying a second incident associated with the IT environment;
determining to use the course of action to respond to the second incident;
identifying the set of instructions corresponding to the course of action in storage; and
executing the set of instructions.

3. The method of claim 1, wherein the course of action is defined using a visual programming language, and wherein a flow diagram is used to represent the course of action using the visual programming language.

4. The method of claim 1, wherein the computing asset is at least one of: an internet protocol (IP) geolocational identification service, a file reputation evaluation service, an intrusion management service, an authentication service, a firewall service, a database service, a data log service, a firewall, a router, a modem, a physical computing system, a virtual computing system, or a data storage resource.

5. The method of claim 1, wherein the incident is a first incident associated with a first entity, and wherein the method further comprises:
identifying a second incident associated with the IT environment, wherein the second incident is associated with a second entity that is different from the first entity;
determining to use the course of action to respond to the second incident;
identifying the set of instructions corresponding to the course of action in storage used to respond to the first incident for the first entity; and
executing the set of instructions to respond to the second incident for the second entity.

6. The method of claim 1, wherein the incident is a first incident, the IT environment is a first IT environment, the computing asset is a first computing asset, and the type of the computing asset is a first type of computing asset, and wherein the method further comprises:
identifying, by the incident management service, a second incident associated with a second IT environment, and wherein the second IT environment is associated with a configuration of computing assets that differs from the first IT environment;
determining the course of action for the second incident, wherein the course of action includes the action to be performed by a second computing asset of the second IT environment;
identifying a second type of the second computing asset at which the action is to be performed in the second IT environment;
translating, by the incident management service, the action into a second computing asset type-specific command used to perform the action at computing assets of the second type of the second computing asset; and
sending, via a network coupling the incident management service to the second computing asset in the IT environment, a request to perform the second computing asset type-specific command, wherein the request causes the second computing asset to perform the second computing asset type-specific command.

7. The method of claim 1, wherein translating the action into the computing asset type-specific command includes generating a plurality of computing asset type-specific commands including the computing asset type-specific command.

8. The method of claim 1, wherein the course of action is defined using a visual programming language and the course of action comprises a flow diagram, and wherein identifying the computing asset type-specific command includes translating the action into the computing asset type-specific command based on configuration data associated with the computing asset.

9. The method of claim 1, wherein translating the action into the computing asset type-specific command is based at least in part on data about the computing asset obtained from an asset database.

10. The method of claim 1, wherein the computing asset provides a service used by one or more components of the IT environment.

11. An apparatus comprising:
   at least one processor; and
   a non-transitory computer-readable storage medium storing instructions which, when executed by the at least one processor, causes the apparatus to:
      identify, by an incident management service, an incident associated with an information technology (IT) environment of a plurality of IT environments monitored by the incident management service;
      determine a course of action to be used to respond to the incident in the IT environment, wherein the course of action includes an operational flow of a plurality of actions used to remediate the incident, and wherein the plurality of actions includes an action to be performed by a computing asset of the IT environment;
      translate, by the incident management service, the course of action into a set of instructions, wherein translating the set of instructions includes identifying, based on a type of the computing asset in the IT environment, a computing asset type-specific command used to perform the action at the computing asset, wherein the incident management service identifies the computing asset type-specific command from a plurality of computing asset type-specific commands for a plurality of types of computing assets;
      execute the set of instructions, wherein executing the set of instructions includes sending, via a network coupling the incident management service to the computing asset, a request to perform the computing asset type-specific command; and
      store the set of instructions for subsequent executions of the course of action against the IT environment.

12. The apparatus of claim 11, wherein the incident is a first incident, and wherein the instructions, when executed by the at least one processor, further cause the apparatus to:
   identify a second incident associated with the IT environment;
   determine to use the course of action to respond to the second incident;
   identify the set of instructions corresponding to the course of action in storage; and
   execute the set of instructions.

13. The apparatus of claim 11, wherein the course of action is defined using a visual programming language, and wherein a flow diagram is used to represent the course of action using the visual programming language.

14. The apparatus of claim 11, wherein the computing asset is at least one of: an internet protocol (IP) geolocational identification service, a file reputation evaluation service, an intrusion management service, an authentication service, a firewall service, a database service, a data log service, a firewall, a router, a modem, a physical computing system, a virtual computing system, or a data storage resource.

15. The apparatus of claim 11, wherein the incident is a first incident associated with a first entity, and wherein the instructions, when executed by the at least one processor, further cause the apparatus to:
   identify a second incident associated with the IT environment, wherein the second incident is associated with a second entity that is different from the first entity;
   determine to use the course of action to respond to the second incident;
   identify the set of instructions corresponding to the course of action in storage used to respond to the first incident for the first entity; and
   execute the set of instructions to respond to the second incident for the second entity.

16. A non-transitory computer-readable storage medium storing instructions which, when executed by one or more processors, cause performance of operations comprising:
   identifying, by an incident management service, an incident associated with an information technology (IT) environment of a plurality of IT environments monitored by the incident management service;
   determining a course of action to be used to respond to the incident in the IT environment, wherein the course of action includes an operational flow of a plurality of actions used to remediate the incident, and wherein the plurality of actions includes an action to be performed by a computing asset of the IT environment;
   translating, by the incident management service, the course of action into a set of instructions, wherein translating the set of instructions includes identifying, based on a type of the computing asset in the IT environment, a computing asset type-specific command used to perform the action at the computing asset, wherein the incident management service identifies the computing asset type-specific command from a plurality of computing asset type-specific commands for a plurality of types of computing assets;
   executing the set of instructions, wherein executing the set of instructions includes sending, via a network coupling the incident management service to the computing asset, a request to perform the computing asset type-specific command; and
   storing the set of instructions for subsequent executions of the course of action against the IT environment.

17. The non-transitory computer readable storage medium of claim 16, wherein the incident is a first incident, and wherein the instructions, when executed by one or more processors, cause performance of operations comprising:
   identifying a second incident associated with the IT environment;
   determining to use the course of action to respond to the second incident;
   identifying the set of instructions corresponding to the course of action in storage; and
   executing the set of instructions.

18. The non-transitory computer readable storage medium of claim 16, wherein the course of action is defined using a visual programming language, and wherein a flow diagram is used to represent the course of action using the visual programming language.

19. The non-transitory computer readable storage medium of claim 16, wherein the computing asset is at least one of: an internet protocol (IP) geolocational identification service, a file reputation evaluation service, an intrusion management service, an authentication service, a firewall service, a database service, a data log service, a firewall, a router, a modem, a physical computing system, a virtual computing system, or a data storage resource.

20. The non-transitory computer readable storage medium of claim 16, wherein the incident is a first incident associated with a first entity, and wherein the instructions, when executed by one or more processors, cause performance of operations comprising:
- identifying a second incident associated with the IT environment, wherein the second incident is associated with a second entity that is different from the first entity;
- determining to use the course of action to respond to the second incident;
- identifying the set of instructions corresponding to the course of action in storage used to respond to the first incident for the first entity; and
- executing the set of instructions to respond to the second incident for the second entity.

* * * * *